US011551440B1

(12) United States Patent
Namballa et al.

(10) Patent No.: US 11,551,440 B1
(45) Date of Patent: Jan. 10, 2023

(54) CONTINUOUS MACHINE LEARNING FOR EXTRACTING DESCRIPTION OF VISUAL CONTENT

(71) Applicant: Amazon Technologies, Inc., Seattle, WA (US)

(72) Inventors: Chitti Babu Namballa, Bellevue, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1210 days.

(21) Appl. No.: 16/040,028

(22) Filed: Jul. 19, 2018

(51) Int. Cl.
*G06V 20/20* (2022.01)
*G06Q 30/02* (2012.01)
*G06N 5/04* (2006.01)
*G06N 20/00* (2019.01)
*G06F 16/58* (2019.01)
*G06N 3/08* (2006.01)
*A61H 31/00* (2006.01)
*G06V 10/44* (2022.01)
*G06F 17/00* (2019.01)

(52) U.S. Cl.
CPC .............. *G06V 20/20* (2022.01); *G06F 16/58* (2019.01); *G06N 3/08* (2013.01); *G06N 5/046* (2013.01); *G06N 20/00* (2019.01); *G06Q 30/0242* (2013.01); *G06Q 30/0251* (2013.01); *A61H 31/005* (2013.01); *G06V 10/454* (2022.01)

(58) Field of Classification Search
CPC ...... G06V 20/20; G06V 10/454; G06F 16/58; G06N 3/08; G06N 5/046; G06N 20/00; G06Q 30/0242; G06Q 30/0251; A61H 31/005
See application file for complete search history.

(56) References Cited

U.S. PATENT DOCUMENTS

| | | | |
|---|---|---|---|
| 9,792,285 B2 * | 10/2017 | Reiley | G06F 16/41 |
| 2010/0262487 A1 * | 10/2010 | Edwards | G06Q 30/02 |
| | | | 705/14.43 |
| 2018/0060512 A1 * | 3/2018 | Sorenson | G06T 7/0012 |
| 2018/0197575 A1 * | 7/2018 | Doherty | G06Q 30/0276 |

FOREIGN PATENT DOCUMENTS

WO WO-2018044872 A1 * 3/2018 ........... G06F 19/321

* cited by examiner

*Primary Examiner* — Quoc A Tran
(74) *Attorney, Agent, or Firm* — Knobbe, Martens, Olson & Bear, LLP (57) ABSTRACT

Aspects of the present disclosure relate to machine learning techniques for continuous implementation and training of a machine learning system for identifying the natural language meaning of visual content. A computer vision model or other suitable machine learning model can predict whether a given descriptor is associated with the visual content. A set of such models can be used to determine whether particular ones of a set of descriptors are associated with the visual content, with the determined descriptors representing a meaning of the visual content. This meaning can be refined based on a multi-armed bandit tracking and analyzing interactions between the visual content and users associated with certain personas related to the determined descriptors.

15 Claims, 4 Drawing Sheets

FIG. 4

CONTINUOUS MACHINE LEARNING FOR EXTRACTING DESCRIPTION OF VISUAL CONTENT

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF THE DRAWINGS

Specific embodiments and inventive features will now be described with reference to the drawings, which are provided for purposes of illustration, and not limitation. Throughout the drawings, reference numbers may be re-used to indicate correspondence between referenced elements.

DETAILED DESCRIPTION

The present disclosure is generally directed to using artificial intelligence or machine learning systems to automatically extract descriptors (e.g., natural language interpretations, keywords, machine-readable representations) of visual content such as an image or video. Further, the present disclosure is directed to using the natural language interpretation to identify users to whom to present the visual content, tracking interactions between those users and the content, and re-training the descriptor extractor based on the tracked interactions. As such, the present disclosure relates to a continuous machine learning for understanding descriptors of visual content.

For example, different types of visual content can be presented to users via a networked computing system. The visual content may be an image, video, animated graphic interchange format ("GIF"), or other form of still image or image sequence. In some implementations, the visual content can be created by an artist or other content creator with a specific target audience in mind. The networked computing system can require tags or descriptors associated with the visual content in order to be able to identify this target audience to whom the visual content should be displayed. However, one problem is that the content creators often do not provide helpful tags or descriptors. In the absence of good tags or descriptors, it is very difficult for a computer system to target a particular audience. In scenarios where the visual content is designed for entertainment, this can result in poor awareness and/or minimal viewing of the visual content. In scenarios where the visual content is desired for advertising, this can result in ineffective advertisement campaigns.

The above-described challenges, among others, are addressed in some embodiments by the disclosed visual content interpretation systems. The disclosed technology can use a number of different machine learning models to extract different descriptors from the visual content, for example using computer vision to understand the content of images and/or videos. In some implementations, the descriptors may be displayed in real time to the creator of the content as it is being made or modified so that the creator gains an understanding of how the content is being interpreted and to whom the content may be displayed. The creator can then refine the content until they achieve the desired meaning. Further, the disclosed technology can refine its understanding of the machine-interpreted meaning of the content by testing how actual users interact with the content. This can enable a computing system to more effectively define and refine the target audience for the content.

As would be appreciated by one of skill in the art, the use of the disclosed machine learning techniques represents a significant technological advance over prior implementations. Specifically, the disclosed techniques enable a computing system to identify the descriptive interpretation of particular visual content. Further, the display of this machine-identified messaging during content creation represents a unique tool for improving the quality of visual content. In addition, the continuous learning aspects of the disclosed techniques enable the computing system to adapt its understanding to changing trends in language and user preferences. As such, the embodiments described herein represent significant improvements in computer-related technology.

The present machine learning techniques are described in various places herein as "continuous." It will be appreciated that this refers to the repeated re-training of the descriptor extractors over time based on tracked user interactions. This re-training can be performed periodically or intermittently, for example every day, week, month, or other desired time interval. Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only and are not intended to be limiting.

Overview of Example Machine Learning System

Figure 1:
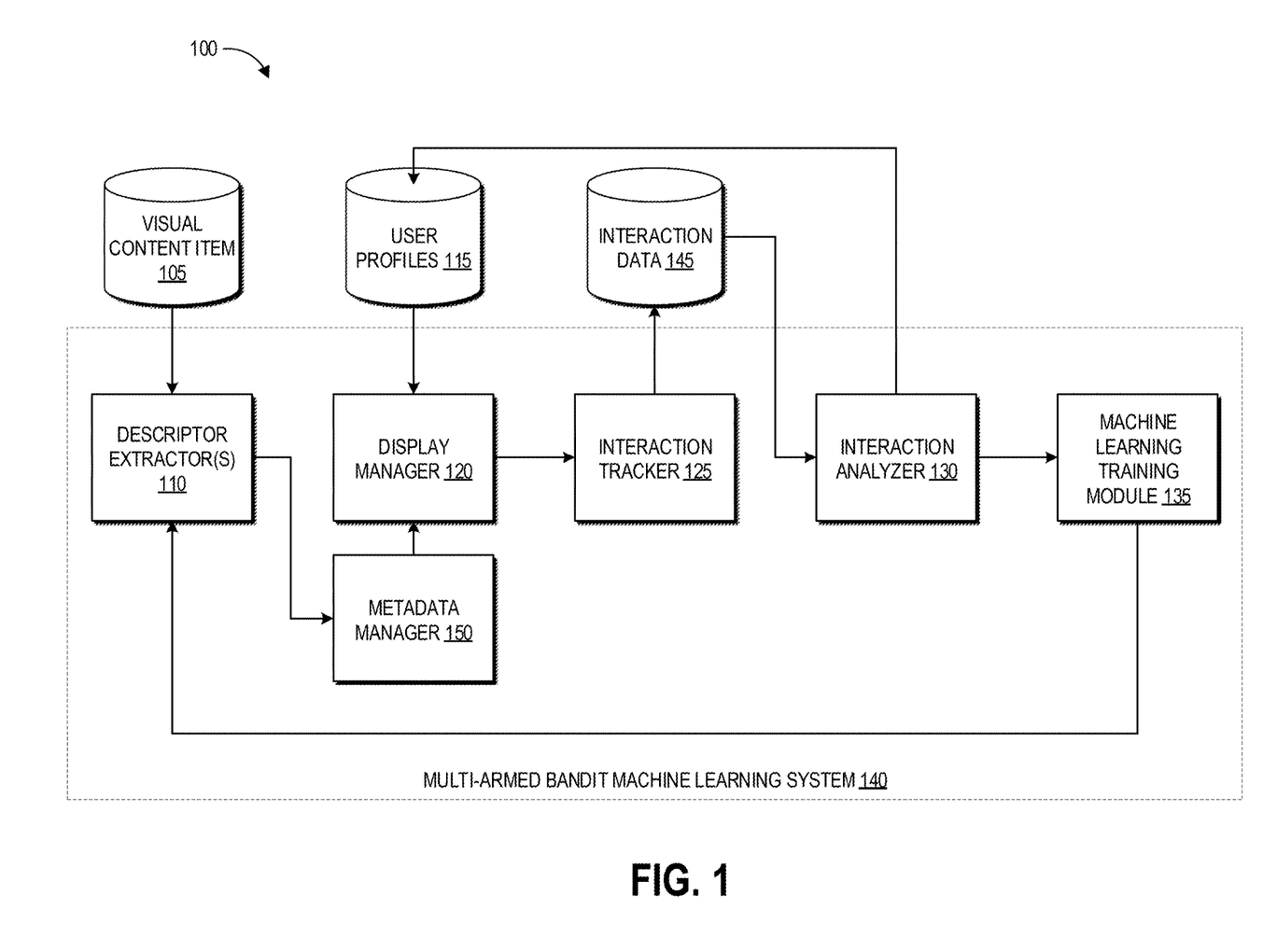
FIG. 1 depicts a schematic diagram of a continuous, multi armed bandit machine learning system for extracting descriptors of visual content according to the present disclosure.

FIG. 1 depicts a schematic diagram 100 of a continuous, multi armed bandit machine learning system 140 for extracting descriptors of visual content according to the present disclosure. The machine learning system 140 includes descriptor extractor(s) 110, a display manager 120, a metadata manager 150, an interaction tracker 125, an interaction analyzer 130, and a machine learning training module 135. These components can comprise computer-executable instructions implemented on one or more processors to perform the described functions. In addition, the machine learning system 140 receives data representing a visual content item 105 and communicates with user profiles data repository 115.

The visual content item 105 can be a single image or a sequence of images (e.g., video, GIF, flash). As used herein, a visual content item 105 refers to any data or file format that can be visually presented to a user on an electronic computing device. A machine-readable representation of the visual content item 105 can be input into the machine learning system 140. In some embodiments, the machine-readable representation can include data representing pixel values or a transformation of the pixel values of the visual content item 105. In some embodiments, the machine-readable representation can include a featurization of the visual content item 105.

The descriptor extractor(s) 110 include one or more machine learning models that each receive as input the machine-readable representation of the visual content item and output a value representing the likelihood that a particular descriptor represents that visual content item. The descriptor extractors 110 can be configured based on a predetermined set of descriptors of interest. For example, in one implementation the visual content can be advertising content or entertainment content presented in an electronic marketplace. The descriptors can include: (1) content descriptors of an advertising campaign's relationship to one or more item sub-categories (e.g., shoes, apparel, watches, electronics, groceries, books, furniture); (2) items that can be visually recognized in the visual content, and associated item type or category (e.g. "cereals", "lipstick", "cutlery", "mobile phone", "television"); (3) associated high value actions ("HVAs") such as a view, search, or purchase action in a specific product category, or browse node category. Other non-purchase HVAs include membership subscription such as Amazon Prime or Amazon Student, creation of wish list in a category or interest, registry creation (such as Baby registry or Wedding registry), video streaming, or Alexa interaction; and (4) associated user personas (e.g. "gadget aficionados", "outdoorsy", "fashionista", "book lovers"). In this implementation, the extracted descriptors beneficially ground the meaning of the visual content within the context of the items and users of the electronic catalog, making it easier for the system to identify particular users to whom to display the visual content. Individual descriptors can be predicted by individual machine learning models. In some implementations, a particular descriptor extraction model can be a computer vision model trained to identify a particular object in the visual content item 105.

For example, a machine learning model for predicting whether a particular descriptor describes a given visual content item can be an artificial neural network. Artificial neural networks are used to model complex relationships between inputs and outputs or to find patterns in data, where the dependency between the inputs and the outputs cannot be easily ascertained. A neural network includes an input layer, one or more intermediate ("hidden") layers, and an output layer, with each layer including a number of nodes. The number of nodes can vary between layers. A neural network is considered "deep" when it includes two or more hidden layers. The nodes in each layer connect to some or all nodes in the subsequent layer and the weights of these connections are typically learnt from data during the training process, for example through backpropagation in which the network parameters are tuned to produce expected outputs given corresponding inputs in labeled training data. Thus, the artificial neural network is an adaptive system that is configured to change its structure (e.g., the connection configuration and/or weights) based on information that flows through the network during training, and the weights of the hidden layers can be considered as an encoding of meaningful patterns in the data.

Some neural networks that can be used for descriptor extraction can be fully connected, that is, each node in the input layer is connected to each node in the first hidden layer, each node in the first hidden layer is connected in turn to each node in the subsequent hidden layer, and so on until each node in the final hidden layer is connected to each node in the output layer. Such fully connected neural networks may be suitable for use with featurized representations of the visual content.

Another type of neural network that can be used for descriptor extraction is a convolutional neural networks ("CNN"). A CNN is a type of artificial neural network that is commonly used for image analysis. Like the artificial neural network described above, a CNN is made up of nodes and has learnable weights. However, the nodes of a layer are only locally connected to a small region of the width and height layer before it (e.g., a 3×3 or 5×5 neighborhood of image pixels), called a receptive field. The hidden layer weights can take the form of a convolutional filter applied to the receptive field. In some implementations, the layers of a CNN can have nodes arranged in three dimensions: width, height, and depth. This corresponds to the array of pixel values in each image (e.g., the width and height) and to the number of images or channels processed (e.g., the depth). The nodes in each convolutional layer of a CNN can share weights such that the convolutional filter of a given layer is replicated across the entire width and height of the input volume (e.g., across an entire frame), reducing the overall number of trainable weights and increasing applicability of the CNN to data sets outside of the training data. Values of a layer may be pooled to reduce the number of computations in a subsequent layer (e.g., values representing certain pixels, such as the maximum value within the receptive field, may be passed forward while others are discarded). Further along the depth of the CNN pool masks may reintroduce any discarded values to return the number of data points to the previous size. A number of layers, optionally with some being fully connected, can be stacked to form the CNN architecture.

The descriptor extractors 110 can include a set of various neural networks each trained to predict the likelihood that a given descriptor applies to the input visual content item 105. The machine-readable representation of the visual content item can be input separately into each neural network in the set, and each neural network can output a probabilistic value representing the likelihood that its descriptor applies to the input visual content item 105. If the probabilistic value exceeds a predetermined threshold (e.g., 50%, 75%, 90%, etc.) then that descriptor can be stored in association with the visual content item 105, for example as metadata associated with the visual content item 105. These identified descriptors represent the extracted meaning of the visual content item 105, and can be stored as an initial set of metadata for the visual content item 105. Beneficially, this initializes the multi-armed banded machine learning system 140 with an initial set of metadata for the visual content even if the content creator has not provided any, thereby mitigating the cold start problem.

The identified descriptors can in some embodiments include behavioral attributes of users who may be interested in the visual content item 105, where these behavioral attributes may otherwise be hard to identify. Example of user behavioral attributes include "mom", "student", "pet owner", "gadget aficionado", "avid reader", "outdoorsy", "nature lover", and so on. Through the continuous learning feedback look described herein, these attributes can be transferred from personas of the users who interact with the visual content item 105 to the visual content item 105.

In some implementations, the identified descriptors can be presented to the creator of the visual content item 105 by the display manager 120 in order to help the creator achieve the intended messaging. For example, the descriptor extractors 110 can help the creator calibrate the action that the visual ad is attempting to drive, based on the recognized content in the ad (for example, "woman trying out shoes", "kids playing basketball outside", "man using blender to make drinks", "girl brushing teeth with electronic toothbrush", etc.). In some implementations, particular descriptors can be trained to detect the presence of a brand, branded message, or branding symbol such as a logo in the visual content item 105, and can provide feedback to the creator regarding a quantified strength of the brand presence in the visual content item. Some implementations can also generate an expected value of the visual content item 105 as a descriptor, calculated as described below with respect to FIG. 2.

The output of the descriptor extractors 110 can be analyzed by the metadata manager 150 to identify which descriptors are likely to represent the visual content item 105. For example, the descriptor extractors 110 may output probabilistic values representing a likelihood of a particular descriptor representing the visual content item 105. The metadata manager 150 can identify any descriptors with probabilistic values over a threshold value, and can include these descriptors in the metadata of the visual content item. Each descriptor can be associated initially with the output probabilistic value, which can be adjusted based on analyzed user interactions as described further below.

These identified descriptors can be provided to the display manager 120. The display manager 120 can use the identified descriptors and user profiles data 115 to identify particular groups of users to whom the visual content should be displayed to test the accuracy of the extracted meaning. The user data 115 can include pre-identified groupings of users who have expressed interested in the set of descriptors of the descriptor extractors 110, for example pre-identified based on such interaction behaviors. The display manager 120 can use this data to identify groupings of users who are interested in each of the identified descriptors, and can cause display of the visual content item 105 to at least some users in these identified groupings. As described in more detail below, the display manager 120 can also cause display of the visual content item 105 to a control group to ascertain the value of the visual content item 105.

The interaction tracker 125 can log interactions between these users and the displayed visual content item 105, and can store these interactions in the interaction data repository 145. For example, the interaction tracker 125 can log whether a user selects the visual content item for viewing, how long the user views the visual content item, how much of the visual content item the user views (if it is a video or other image sequence), and whether the user bookmarks, shares, downloads, or otherwise saves the visual content item. In addition, in scenarios in which the visual content item is an advertisement, the interaction tracker 125 can log any interactions between the user and particular electronic catalog items associated with the visual content item. For example, interaction tracker 125 can determine whether the user selects any navigational links to any electronic catalog items associated with the visual content item (e.g., whether the user selects to view a detail page presenting information about an electronic catalog item represented by the visual content item), whether the user purchases, rents, or shares the electronic catalog item, or whether the user adds the electronic catalog item to a digital list.

The interaction analyzer 130 can analyze the interaction data 145 to determine which types of users are most interested in the visual content item 105. For example, the users within a particular grouping may share or be assigned a common user persona, such that the continuous learning techniques described herein can identify the top k number of user personas who engage with the visual content item 105. The interaction analyzer can use a rule-based association mining technique to identify these top user personas. For example, if a high percentage (based on some predetermined threshold) of "gadget aficionado" personas are interested in the visual content item 105, then the interaction analyzer 130 can associate that "gadget aficionados" are interested in this visual content item 105 and can determine that the visual content item 105 is related to electronics. The results of the interaction analyzer 130 can be stored in the user profiles data repository 115.

In addition, the interaction analyzer 130 can track user behavior for a predetermined timeframe after engaging with the visual content item 105, for example one day, one hour, or one browsing session (although other timeframes are possible in various implementations). The interaction analyzer 130 can statistically analyze the tracked actions of these uses to determine whether a significant percentage of users are taking a specific action post-engagement. If so, it is likely that the visual content item 105 is intended to promote that specific action (e.g., purchase of an electronic catalog item, signup for a service, subscription to a membership). The interaction analyzer 130 can use causal inference to identify the incremental actions that are taken by users upon interaction/engagement with the visual content item 105.

In some implementations, each user can be represented by a state vector with membership statuses of different programs and purchase cardinality of different item categories. The interaction analyzer 130 can identify casual impact on user state change upon engagement with the visual content item 105. The interaction analyzer 130 can take the difference of the user state vectors before and after engagement with the visual content item 105. The interaction analyzer 130 can use casual inference to identify average state change that the engagement with the visual content item 105 has caused.

In some implementations, the extracted features and/or identified user personas and/or state changes can be represented in a machine-readable format that does not convey any specific meaning to a human user. The machine learning system 140 can use neural embeddings to generate textual representations that describe these features.

The results of the interaction analyzer 130 can be fed back into the user data 115 for purposes of refining the user personas or groupings associated with particular users. In this manner, the disclosed techniques can more accurately construct representations of user interest for purposes of matching particular users with particular visual content.

In addition, based on the results of the interaction analyzer 130, the machine learning training module 135 can re-train particular descriptor extractors such that their outputs more closely align with the observed user interactions. The machine learning training module 135 can include computer-executable instructions regarding training the network parameters for particular ones of the descriptor extractors 110. Further, the metadata associated with the visual content item 105 can be refined based on the results of the interaction analyzer 130. For example, the metadata manager 150 can use the new output score from a re-trained descriptor extractor as the adjusted score for a descriptor in the metadata. As such, the feedback provided by user interactions, which is used to re-train the descriptor extractor, is thus propagated into the metadata in the form of an updated score.

Thus, the disclosed machine learning system 140 can be considered as having two portions: (1) a descriptor extraction portion (including the machine learning descriptor extractors 110), and (2) a feedback portion (including the interaction tracker 125, interaction analyzer 13, and training model 135) for refining the extracted message of the visual content based on analysis of logged user interactions with the visual content.

In addition, the feedback analysis can help add new keywords to the set of descriptors that the descriptor extractors 110 are trained to identify. For example, consider that a CNN is provided with an image of a spaceship, but the CNN is not trained to recognize spaceships, and instead is trained to recognize stars and/or a planet in the background of the image. Based on identifying the stars and/or planet, the display manager 120 can determine to show the image to a user persona group of "astronomers" that is associated with the keywords stars/planet. The users in this group can have purchased books on space travel and watched movies about spaceships, and thus the "astronomers" user group can also be associated with the keyword "spaceship". After a threshold percentage or number of the "astronomers" have interacted with the image, the keywords associated with their user group can be populated into the metadata of the image and/or used to re-train the CNN. In the latter scenario, the CNN can be trained to have a new ability (e.g., recognizing a spaceship) based on the keywords extracted from past behavior of users who express interest in the image.

Figure 2:
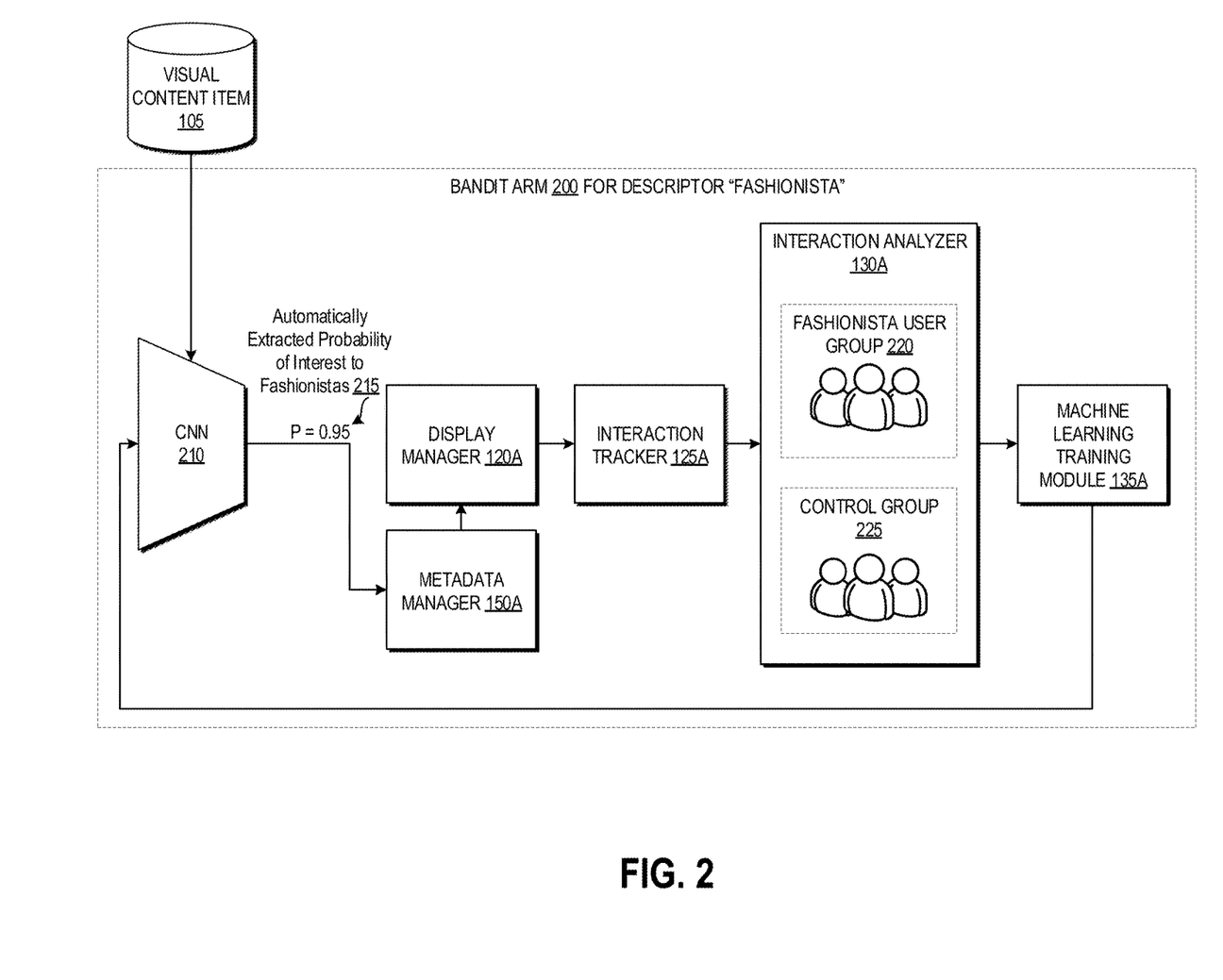
FIG. 2 depicts an example bandit arm of the machine learning system of FIG. 1.

FIG. 2 depicts an example bandit arm 200 of the machine learning system 140 of FIG. 1. In probability theory, the multi-armed bandit problem represents a problem in which a fixed limited set of resources must be allocated between competing (alternative) choices in a way that maximizes their expected gain. The multi-armed bandit can be seen as a set of real distributions (for example, Bayesian linear models), each distribution being associated with the rewards delivered by one of the bandit arms. In some implementations of the present disclosure, each visual content item descriptor can be considered as a separate "arm" of the overall multi-armed bandit machine learning system 140. FIG. 2 depicts an example bandit arm 200 corresponding to a given descriptor, here shown as an example user persona of "fashionista" (e.g., a person who designs or follows fashion).

The bandit arm 200 includes a CNN 210 as the descriptor extractor 110 for this particular descriptor of "fashionista", and portions of the display manager 120A, interaction tracker 125A, interaction analyzer 130A, and machine learning training module 135A that are used with respect to descriptor A. The CNN 210 outputs a probability 215 of the association of the visual content item with descriptor A. In this example, the probability is depicted as being 95%. This probability is passed to the metadata manager 150A. The metadata manager 150 determines whether the probability exceeds a predetermined threshold and, if so, stores the descriptor (here, "fashionistas") in association with the output probability in the metadata of the visual content item 105. The display manager 120A then identifies user groupings/personas that are associated with the descriptor and causes presentation to at least some users in the grouping/ associated with the persona. This can include, for example, identified users who access an electronic catalog during the timeframe in which the interaction tracker 125A is logging user interactions with the visual content.

As illustrated in FIG. 2, the interaction tracker 125A can log interactions between users identified by the display manager 120A (e.g., users associated with the persona of "fashionista") and the displayed content. Based on analysis of these interactions, the interaction analyzer 130A can separate the users into the fashionista user group 220 (e.g., users who should remain associated with the persona of "fashionista") and a control group 225 (e.g., users who should not be associated with the persona of "fashionista"). For example, users who interact with the displayed content can be put into the "fashionista" user group 220, and users who do not interact with the displayed content can be put into the control user group 225. The interaction analyzer 130A can use a comparison between interest levels from these two groups to determine the causal impact of the visual content on the fashionista user group, for example representing the value of a particular advertising campaign. In addition, the interaction analyzer 130A can use the interest of the fashionista user group 220 to refine the training of the CNN 210 such that its output matches (or more closely aligns with) the observed interest of the fashionista user group 220. After retraining, the visual content item 105 can again be forward passed through the retrained CNN 210 to generate a new output score, which can replace the previous score in the metadata. Further, if the interaction analyzer 130A determines that this particular visual content is highly interesting to the fashionista user group 220 but the interactions of particular users within that group indicate no interest or disinterest in the visual content, then the machine learning system 140 can refine the fashionista user group 220 to exclude such users. In addition, the output of the interaction analyzer 130A can be provided to the metadata manager 150A for adjusting the score of the metadata.

Overview of Example Execution Environment

Figure 3:
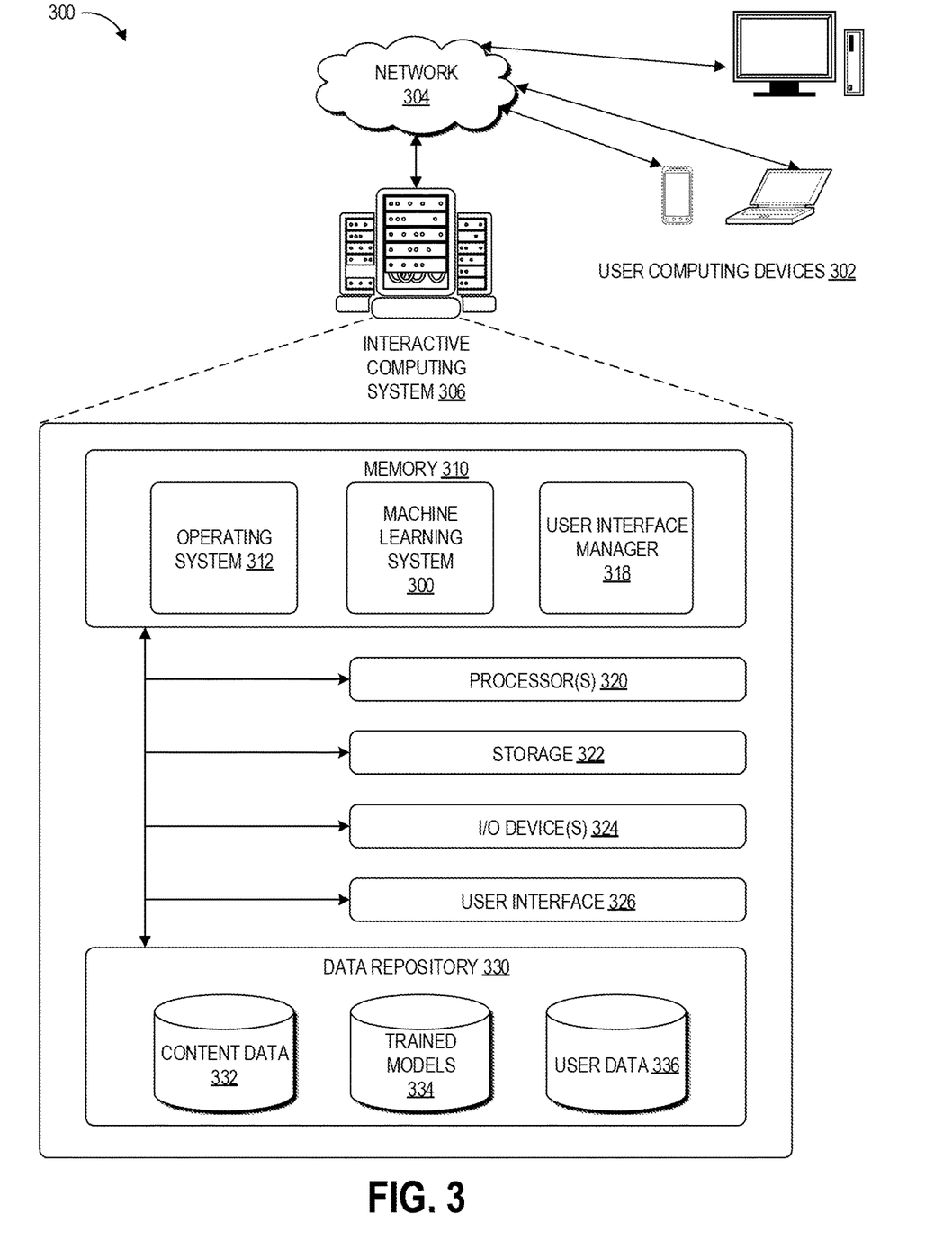
FIG. 3 depicts a schematic diagram of an illustrative operating environment in which an interactive computing system provides users with visual content according to descriptors extracted via the machine learning system of FIG. 1.

FIG. 3 illustrates a schematic block diagram of an illustrative operating environment 300 in which an interactive computing system 306 provides continuous learning of visual content descriptors and uses such descriptors to deliver content to users, for example including the machine learning system of FIGS. 1 and 2.

The interactive computing system 306 can communicate over network 304 with user devices 302. The network 304 can include any appropriate network, including an intranet, the Internet, a cellular network, a local area network or any other such network or combination thereof. User devices 302 can include any network-equipped computing device, for example desktop computers, laptops, smartphones, tablets, e-readers, gaming consoles, and the like. Users can access the interactive computing system 306 and interact with items therein via the network 304 and can be provided with content via the network 304.

The interactive computing system 306 may include one or more computers, perhaps arranged in a cluster of servers or as a server farm. The memory and processors that make up these computers may be located within one computer or distributed throughout many computers (including computers that are remote from one another) as detailed herein. These servers may be configured to train and use visual content descriptor extraction models and manage display of visual content. For example, the interactive computing system 306 may be configured to manage marketing programs offered in connection with an electronic marketplace.

The interactive computing system 306 may include at least one memory 310 and one or more processing units (or processor(s)) 320. The memory 310 may include more than one memory and may be distributed throughout the interactive computing system 306. The memory 310 may store program instructions that are loadable and executable on the processor(s) 320 as well as data generated during the execution of these programs. Depending on the configuration and type of memory, the memory 310 may be volatile (such as random access memory ("RAM")) and/or non-volatile (such as read-only memory ("ROM"), flash memory, or other memory). In some examples, the memory 310 may include multiple different types of memory, such as static random access memory ("SRAM"), dynamic random access memory ("DRAM"), or ROM.

The memory 310 can store the program instructions as a number of modules that configure processor(s) 320 to perform the various functions described herein, for example operating system 312 for interacting with the computing system 300, as well as the machine learning system 300 and user interface manager 318, which can be in direct communication with one another or distributed among computing devices within a networked computing system and in communication with each other. One example of the machine learning system 300 can include a multi-armed bandit machine learning system 140 as described above, however other suitable machine learning models for descriptor extraction and interaction analysis may be used in other implementations. The user interface manager 318 can configure a user interface for display of particular visual content items to particular users, and can also be configured to track user interactions (e.g., clicks, selections, views) between the user and the content.

The processor 320 may include one or more general purpose computers, dedicated microprocessors, graphics processors, or other processing devices capable of communicating electronic information. Examples of the processor 320 include one or more application-specific integrated circuits ("ASICs"), graphical processing units ("GPUs"), field programmable gate arrays ("FPGAs"), digital signal processors ("DSPs") and any other suitable specific or general-purpose processors. The processor 320 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 306 may also include additional storage 322, which may include removable storage and/or non-removable storage. The additional storage 322 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 310 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The interactive computing system 306 may also include input/output (I/O) device(s) and/or ports 324, such as for enabling connection with a keyboard, a mouse, a pen, a voice input device, a touch input device, a display, speakers, a printer, or other I/O device. The interactive computing system 306 may also include a user interface 326. The user interface 326 may be utilized by a user to access portions of the interactive computing system. In some examples, the user interface 326 may include a graphical user interface, web-based applications, programmatic interfaces such as application programming interfaces (APIs), or other user interface configurations. The user interface 326 can include displays of visual content as described herein. In some embodiments, the I/O device(s) and/or ports 324 and user interface 326 can be part of a user computing device accessing interactive computing system 306 via network 304.

The interactive computing system 306 also includes a data store 330. In some examples, the data store 330 may include one or more data stores, databases, data structures, or the like for storing and/or retaining information associated with the computing system 300. Thus, the data store 330 may include data structures, such as content data repository 332, trained models data repository 334, and user data repository 336. These each comprise one or more physical data storage devices storing the designated data. The content data repository 332 can store data representing visual content (e.g., pixel values of images, image sequences, and any associated descriptors that have been identified by the machine learning system 300). The trained models data repository 334 can store the parameters and structures of trained models for use in identifying the descriptors of visual content. The user data repository 115 can include the user profiles data 115 and tracked interactions 145 as described above, for example storing user interaction histories, user personas, and user state vectors associated with particular users. Thus, the machine learning system 140 is able to refine its understanding of the relevance of particular descriptors to both individual users and to particular visual content.

Overview of Example Machine Learning Process

Figure 4:
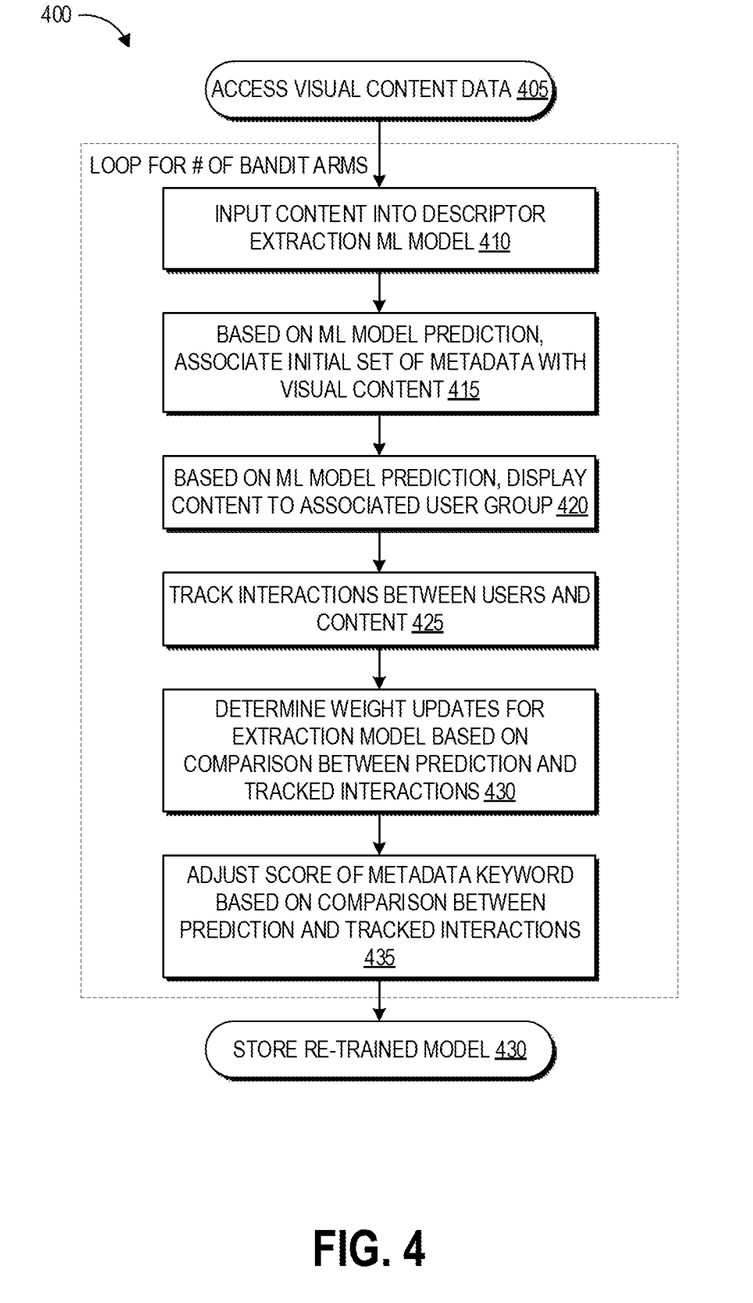
FIG. 4 is a flowchart of an example process for generating descriptors of visual content, tracking interactions of users with the visual content, and refining the machine learning descriptor extractor using the machine learning system of FIG. 1.

FIG. 4 is a flowchart of an example process 400 for generating descriptors of visual content, tracking interactions of users with the visual content, and refining the machine learning descriptor extractor model(s). The process 400 can be implemented for example using the machine learning system 140 of FIG. 1.

At block 405, the machine learning system 140 can access visual content data 405. This can include, for example, a machine-readable representation of an image or sequence of images, such as pixel values or a featurization. For purposes of illustration, consider the following example with respect to the process 400. In an illustrative example, the content can include a video of a baby in a diaper playing with a soccer ball.

At block 410, the representation of the visual content data can be input into a particular descriptor extractor 110. As described herein, individual descriptor extractors can be machine learning models trained to predict the likelihood that the visual content depicts, or is relevant to, a particular descriptor. Thus, at block 410 the representation of the visual content data can be forward passed through the machine learning model to generate a prediction regarding the likelihood that the visual content depicts, or is relevant to, a particular descriptor. For example, a descriptor extractor can be a machine learning model trained to identify the baby, another descriptor extractor can be a machine learning model trained to identify the diaper, and another descriptor extractor can be a machine learning model trained to identify the soccer ball.

At block 415, if the output of the machine learning model indicates that the descriptor is depicted by or relevant to the visual content, the system can store that descriptor in an initial set of metadata associated with the visual content. For example, the descriptors "baby," "diaper" and "soccer" can be stored as initial metadata of the visual content. Each of these keywords can have an associated initial metadata score, for example the score output by the corresponding descriptor extractor model.

At block 420, if the output of the machine learning model indicates that the descriptor is depicted by or relevant to the visual content, the display manager can identify a grouping of users to whom the visual content should be displayed. As described above, the group of users may be users associated with a persona that relates to the descriptor, and in some implementations the descriptor may be the user persona. Continuing the above example, the display manager 120 can identify a user group of people who have created a baby registry based on the keywords "baby" and/or "diaper," and can identify a user group of sports enthusiasts based on the "soccer" keyword.

At block 425, the interaction tracker 125 can track interactions between the users and the displayed visual content. For example, the interaction tracker 125 can track hits and impressions in some implementations. Impressions refer to user exposures to certain marketing content, for example by seeing or hearing advertisements without necessarily taking any action. On the other hand, a "hit" can refer to an impression that also involves user interaction with the marketing content, for example a user clicking on a navigational link of the marketing content. The interaction tracker 125 can also track user behaviors with respect to items in an electronic marketplace after exposure to the visual content, as well as the other user behaviors described herein.

At block 430, the machine learning training module 135 can determine weight updates for the extraction model based on a comparison between the prediction made by the model at block 410 and the tracked interactions. For example, the model may be a convolutional neural network, and its weights may be updated via backpropagation based on the deviation between the prediction and an interest computed by the interaction analyzer 130 based on the logged interactions. As described above, a CNN can also be trained to recognize new objects based on keywords associated with interested user persona groups. For example, the interaction analyzer 130 can determine that users who created baby registries have interacted above a threshold with the video, and this user group may also be associated with the keyword "onesie" based on their past interactions (such as purchases of baby onesies). As such, a CNN can be trained to recognize onesies from the video (and optionally other training data).

At block 435, the metadata manager 150 of the machine learning system 140 can adjust the score of the metadata keyword based on the tracked interactions. For example, the interaction analyzer 130 can determine that users who created baby registries have interacted above a threshold with the video. As such, interaction analyzer 130 can determine a high interest score associated with "baby" and "diaper", and the corresponding CNNs can be re-trained to predict the respective interest score. The new score output by the re-trained CNN can be used as the adjusted score for the metadata descriptor "baby" or "diaper". In addition, the interaction analyzer 130 can determine a lower interest score associated with sports enthusiasts based on interactions that indicate the sports enthusiasts were not interested in the video. The "soccer" CNN can be retrained based on this lower interest score, and the new score output by the re-trained model can be used as the adjusted score for the metadata descriptor "soccer". In this manner, the scores for "baby" and "diaper" can be increased based on the user interactions, while the score for "soccer" can be decreased based on the user interactions.

At block 440, the parameters of the re-trained extraction model can be stored, for example in the trained models data repository 334. In this manner, the extraction model is refined based on tracked user interactions with its predictions, such that the system continues to learn how to make more accurate assessments of the meaning of visual content.

As indicated by the dashed box around blocks 410-440, these blocks can be looped for a number of bandit arms (e.g., for each descriptor of the desired descriptor set). In addition, this looped process 400 can be repeated periodically to achieve the continuous learning described herein. In some implementations, blocks 405-420 can be performed in an "offline mode," that is in advance of using the identified descriptors to present visual content to users. In contrast, block 425 can be performed in real time, that is as users are interacting with the displayed visual content item and/or items of an electronic catalog. Blocks 425-440 can again be performed in an offline mode in some embodiments.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method, comprising:
   accessing data representing a visual content item;
   providing the data to an extraction portion of a machine learning system to determine a descriptor associated with the visual content item, said descriptor comprising a textual keyword descriptive of the visual content item;
   storing the descriptor in a set of metadata associated with the visual content item;
   assigning a score to the descriptor based on an output of the extraction portion;
   identifying a set of users who have expressed interest in the descriptor;
   causing display of the visual content item to at least some users of the set of users;
   tracking interactions between the at least some users and the visual content item;
   using a feedback portion of the machine learning system to analyze the interactions; and
   updating the score associated with the descriptor based on a result of analyzing the interactions using the feedback portion.

2. The computer-implemented method of claim 1, further comprising generating a measure of interest of the at least some users in the visual content item based on analyzing the interactions using the feedback portion of the machine learning system.

3. The computer-implemented method of claim 2, wherein the extraction portion comprises a neural network trained to predict a likelihood that the descriptor is associated with the visual content item, the computer-implemented further comprising updating parameters of the neural network based on a difference between the likelihood predicted by the neural network and the measure of interest of the at least some users.

4. The computer-implemented method of claim 1, wherein the visual content item comprises an advertisement for an item in an electronic catalog, the computer-implemented further comprising determining whether particular ones of the at least some users purchase the item after being presented with the visual content item, wherein the interactions comprise purchases or non-purchases of the item.

5. The computer-implemented method of claim 1, wherein updating the score comprises:

re-training the extraction portion of the machine learning system based on the result of analyzing the interactions; and obtaining a new score from the re-trained extraction portion.

6. A computer-implemented method, comprising:

accessing data representing a visual content item;

providing the data to an extraction portion of a machine learning system to determine a descriptor associated with the visual content item;

storing the descriptor in a set of metadata associated with the visual content item;

assigning a score to the descriptor based on an output of the extraction portion;

identifying a set of users who have expressed interest in the descriptor;

causing display of the visual content item to at least some users of the set of users;

tracking interactions between the at least some users and the visual content item;

using a feedback portion of the machine learning system to analyze the interactions; and updating the score associated with the descriptor based on a result of analyzing the interactions using the feedback portion;

wherein the feedback portion comprises a first arm of a plurality of arms of a multi-armed bandit, the computer-implemented further comprising using the plurality of arms to determine whether each descriptor of a plurality of descriptors relates to the visual content item.

7. The computer-implemented method of claim 6, wherein individual descriptors of the plurality of descriptors are associated with particular user personas, the computer-implemented method further comprising using the plurality of arms to identify a top number of user personas interested in the visual content item.

8. The computer-implemented method of claim 7, further comprising:

increasing scores assigned to descriptors associated with the top number of user personas in the metadata associated with the visual content item; and causing display of the visual content item to another user associated with one of the top number of users personas based on the metadata.

9. The computer-implemented method of claim 7, further comprising, for particular ones of the plurality of arms:

determining based on an output of a corresponding machine learning model that an associated user persona is likely to be interested in the visual content item;

exposing the visual content item to at least one user associated with the associated user persona; and based on an interaction between the at least one user and the visual content item, determining whether the associated user persona is actually interested in the visual content item.

10. A non-transitory computer-readable medium storing instructions that, when executed, cause at least one processor to perform operations comprising:

accessing data representing visual content;

providing the data to an extraction portion of a machine learning system to determine a descriptor associated with the visual content;

identifying a user persona associated with the descriptor;

exposing the visual content item to a user associated with the user persona;

tracking interactions between the user and the visual content;

using a feedback portion of the machine learning system to analyze the interactions; and re-training the extraction portion of the machine learning system based on a result of analyzing the interactions using the feedback portion;

wherein the feedback portion comprises a first arm of a plurality of arms of a multi-armed bandit, the operations further comprising using the plurality of arms to determine whether each descriptor of a plurality of descriptors relates to the visual content item.

11. The non-transitory computer-readable medium of claim 10, wherein the visual content comprises an advertisement for an item in an electronic catalog, the operations further comprising determining whether particular ones of the at least some users purchase the item after being presented with the visual content, wherein the interactions comprise purchases or non-purchases of the item.

12. The non-transitory computer-readable medium of claim 10, wherein individual descriptors of the set of descriptors are associated with particular user personas, the computer-implemented method further comprising using the plurality of arms to identify a top number of user personas interested in the visual content item.

13. The non-transitory computer-readable medium of claim 12, the operations further comprising:

including the top number of user personas in metadata associated with the visual content; and causing display of the visual content to another user associated with one of the top number of users personas based on the metadata.

14. The non-transitory computer-readable medium of claim 12, the operations further comprising, for particular ones of the plurality of arms:

determining based on an output of a corresponding machine learning model that an associated user persona is likely to be interested in the visual content;

exposing the visual content to at least one user associated with the associated user persona; and based on an interaction between the at least one user and the visual content, determining whether the associated user persona is actually interested in the visual content.

15. The non-transitory computer-readable medium of claim 12, wherein the descriptor comprises a machine-understandable representation of a meaning of the visual content in a context of an electronic catalog, the operations further comprising using the meaning to identify another user to whom to display the visual content.

* * * * *

UNITED STATES PATENT AND TRADEMARK OFFICE
CERTIFICATE OF CORRECTION

PATENT NO. : 11,551,440 B1
APPLICATION NO. : 16/040028
DATED : January 10, 2023
INVENTOR(S) : Chitti Babu Namballa Page 1 of 1

It is certified that error appears in the above-identified patent and that said Letters Patent is hereby corrected as shown below:

In the Claims

In Column 14 at Line 54, after "computer-implemented" insert --method--.

In Column 14 at Line 62, after "computer-implemented" insert --method--.

In Column 15 at Line 28, after "computer-implemented" insert --method--.

Signed and Sealed this
Eighteenth Day of April, 2023

Katherine Kelly Vidal
*Director of the United States Patent and Trademark Office*